United States Patent

[11] 3,614,458

| [72] | Inventor | Ira B. Stein<br>924 Northfield Road, Woodmere, N.Y. 11598 |
|---|---|---|
| [21] | Appl. No. | 30,850 |
| [22] | Filed | Apr. 22, 1970 |
| [45] | Patented | Oct. 19, 1971 |

[54] AUTOMOBILE THEFT PREVENTION DEVICE
7 Claims, 2 Drawing Figs.

[52] U.S. Cl.................................................... 307/10,
180/114, 340/64
[51] Int. Cl....................................................... H02g 3/00
[50] Field of Search........................................... 307/10 AT,
10; 180/114; 340/63, 64

[56] References Cited
UNITED STATES PATENTS
2,751,507  6/1956  Crum .......................... 307/10 AT

*Primary Examiner*—Herman J. Hohauser
*Attorneys*—Mark T. Basseches and Paula T. Basseches ABSTRACT: A self-activating automobile theft prevention device including a time delay relay, preferably of the thermal type. The apparatus will interrupt the ignition circuit of an automobile unless, within a predetermined time after activation of the ignition circuit, a concealed relay-defeating switch is activated.

PATENTED OCT 19 1971

3,614,458

INVENTOR.
IRA B. STEIN

BY Mark Lusnecher

ATTORNEY

AUTOMOBILE THEFT PREVENTION DEVICE

BACKGROUND OF THE INVENTION

This invention is in the field of theft prevention devices for automobiles.

As is well known, the incidence of automobile theft is increasing progressively. Numerous safety devices, such as alarms, transmission locks and the like have been employed to combat such trend. While such apparatuses are, to a degree, effective in accomplishing their intended purpose, it is frequently the case that the driver does not take the trouble to set the alarm or activate the safety device.

In many other instances, the safety device is calculated to be effective only against persons not having a key to the auto. In the case of such devices, if the owner should leave the keys in the auto, the safety device is, of course, of no avail. The problem is particularly acute in the case of rental cars, since the lessee is less likely to care for the property of others. In many instances, leasing companies are unable to obtain theft insurance since the underwriting of such insurance becomes uneconomical from the standpoint of the insurance company.

SUMMARY OF THE INVENTION

The invention may be summarized as relating to a time delay relay circuit introduced into the ignition circuit of an automobile. The circuitry is such that it will permit an auto to start when it has been subjected to such theft techniques as bypassing of the ignition switch, use of a so-called hot box, etc. The car will operate for a predetermined short period of time, the objective of the time delay being to cause the car to stall at a position remote from the point at which it was stolen. Presumably the thief will approach a car only when it is in a relatively secluded location so that his activities will not be readily observed. The time delay mechanism permits the car to be started and driven from the secluded location, only to stall at some other location, in all likelihood less private and not of the thief's choosing. By this means it is reasoned that the thief will abandon the automobile.

The apparatus is characterized particularly by a defeat circuit which prevents opening of the ignition circuit by the time delay relay. The defeat circuit is activated by depressing a hidden switch after the conventional key has been used. The defeat circuit is operative only so long as the key switch is in the "on" position. When the key switch is turned off (or, in accordance with an embodiment of the invention, when it is turned off for more than a predetermined number of seconds), the defeat circuit is deactivated. Accordingly, if the user should thereupon restart the car through the use of a proper key or otherwise, the time delay relay will interrupt the ignition circuit in the manner aforesaid.

It is therefore an object of the invention to provide a self-setting automobile theft prevention device.

It is a further object of the invention to provide a theft prevention device of the type described which will permit the automobile readily to be started by one who fails to deactivate the protection device but wherein the automobile will stall after the passage of a predetermined amount of time.

A further object of the invention is the provision of a protection device of the type described in which, after the automobile has stalled, it cannot again be started, even by one having knowledge of the protection device, until the passage of an additional time period.

To attain these objects and such further objects as may appear herein or be hereinafter pointed out, reference is made to the accompanying drawings, forming a part hereof, in which.

Figure 2:
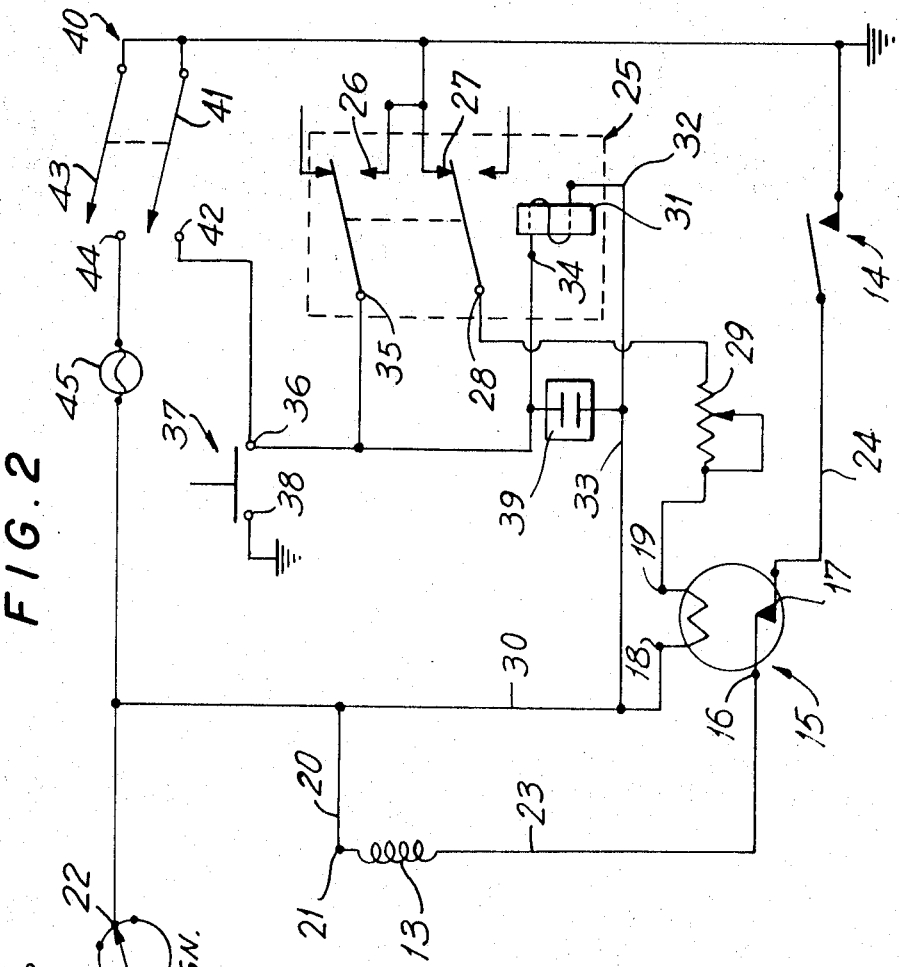
FIG. 2 is a schematic circuit diagram of the protection apparatus.

Reference is now made to the drawings wherein an automobile 10 is provided with the usual battery 11 and ignition switch 12. 13 is the primary winding of the ignition coil, the circuit to which is made and broken by the usual set of ignition points 14. While the schematic FIG. 2 illustrates a negative ground system, it will be appreciated that the device is readily adapted for use with positive ground circuitry.

15 is a time delay relay, preferably of the thermal type. As is well known, such relays may include normally closed contacts 16, 17 and heater contacts 18, 19. Current flow through the heater contacts 18, 19 causes a progressive heat increase within the interior of the relay, and when the heat buildup reaches a predetermined value, the contact between the elements 16, 17 is broken, as by the deflection of a bimetallic strip.

A conductor 20 connects one terminal 21 of the ignition coil to the "on" contact 22 of the ignition switch 12, thus connecting one terminal of the primary of the coil to the positive electrode of the battery whenever the ignition switch is closed. Conductor 23 connects the other terminal of the primary of the ignition coil 13 to contact 16 of the time delay relay 15.

The relay contact 17 is connected by conductor 24 to the ignition point circuit 14 of the automobile, the other of the point contacts being grounded, as is usual.

It will thus be seen that the circuit through the primary of the ignition coil 13 extends through contacts 16, 17 of the time delay relay, and so long as such contacts remain in the normal, closed position, as shown in FIG. 2, the ignition circuit for the automobile will operate in the usual manner. It will be further appreciated that when current flow through the heater contacts 18, 19 developes sufficient heat within the thermal time delay relay 15, contacts 16, 17 will be opened and the ignition circuit will no longer be operative. It should be observed that a heat buildup sufficient to open the contacts 16, 17 will take some considerable time to dissipate, in a preferred type of relay, and a waiting period is thus necessary before the car may again be started.

Current flow through the heater contacts 18, 19 is controlled by a reset relay 25, next to be described.

The reset relay is of the double-pole double-throw type and includes grounded contacts 26, 27. Contact 27 of the relay is, in the normal position, connected with movable contact 28 of the reset relay. Contact 28 of the relay is thus normally grounded and connected, via variable time delay control resistor 29, to contact 19 of the thermal relay.

Contact 18 of the thermal relay is connected by conduit 30 to the positive terminal of the battery 11 through the lock switch 12. It will thus be observed that with the circuit components in the position indicated in FIG. 2, when the key is turned on the ignition circuit is completed through the thermal relay contacts 16, 17 and the heater contacts 18, 19 are energized, the circuit through such contacts running through conductor 30, variable resistor 29, movable contact 28 of the reset relay, to contact 27 of such relay, and thence to ground. It will accordingly be observed that one in possession of a key, who does nothing more than activate the lock switch may successfully drive the automobile until such time as the heat buildup causes the contacts 16 and 17 to separate. The time required for the heat buildup may be varied in accordance with the setting of resistor 29.

In order to permit an authorized user to drive the automobile without interference, the relay 25 is provided with a latching coil 31. It will be observed that when there is current flow in the coil 31, the movable contact 28 will be drawn away from the grounded contact 27, breaking the circuit through the heating contacts 18, 19 of the thermal delay relay.

One winding terminal 32 of the latching coil 31 is connected via conductors 33 and 30 to the terminal 22 of the lock switch 12. Thus, so long as the switch 12 is in the "on" position, terminal 32 of the coil is connected to the positive electrode of the battery 11. The other terminal 34 of the latching coil 31 is connected to movable contact 35 of the reset relay and to contact 36 of a normally open reset switch 37, the other terminal 38 of which switch is grounded.

From the foregoing it will be seen that when the ignition switch 12 is turned on, there is an initial current flow through the heating contacts 18, 19 of the thermal delay relay. However, the current flow through the heater contacts is interrupted and the car caused to operate in a normal manner by closing the reset switch 37, causing the terminal 36 of such switch to be momentarily grounded by connection to terminal 38.

When the terminal 36 is grounded, current is permitted to flow through the coil 31, drawing the movable contact 35 into engagement with contact 26, and opening the connection between contacts 28 and 27. The opening of contacts 28, 27 interrupts current flow through the heater terminals 18, 19 of the thermal relay. The closing of contacts 35 and 26 grounds terminal 34 of the latching coil, whereupon current continues to flow through the latching coil, notwithstanding opening of the switch 37.

So long as the coil 31 remains energized, i.e., so long as the ignition switch remains on, the car will be permitted to operate in the conventional manner.

Optionally, a condenser circuit 39 is connected across the terminals 32, 34 of the latching coil 31. The charge in the condenser circuit will maintain the current flow through the latching coil even if the ignition switch 12 is shut off for a short period of time, as would be the case in the event that the car stalled in traffic.

The condenser circuit, which has been only diagrammatically illustrated, preferably maintains a current flow in the coil for a period of about 20 seconds. Thus, if the ignition switch is turned off for a period of 20 seconds or longer, the coil 31 will be deenergized and the movable contacts 28, 35 will resume the positions shown in FIG. 2. The delay function of circuit 39 may be accomplished mechanically without departing from the spirit of this concept.

Figure 1:
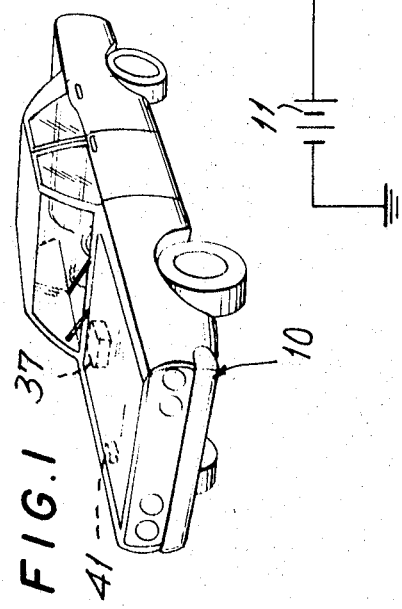
FIG. 1 is a perspective view of an automobile, illustrating suggested locations for the protection defeat switch and for a bypass switch.

There is shown at 40 a bypass switch which may be used to defeat the protection device. The bypass switch 40 is preferably located, as shown in FIG. 1, at some inaccessible and inconspicuous position within the automobile. The bypass switch may be used, for instance, in a rental car until the car is delivered to a lessee. When the car is delivered, the switch is opened to activate the protection circuitry previously described.

The switch 40 includes a grounded movable contact 41 which, in the closed position, connects terminal 42 to ground, thus energizing the coil 31 at all times when the ignition lock switch is on. Preferably the bypass switch 40 includes a second movable contact 43 which, in the closed position, engages contact 44, completing a circuit through a pilot bulb 45. The pilot bulb 45 provides a warning that the bypass switch is in the closed position and that the protection device has been deactivated.

From the foregoing it will be seen that there is provided an automobile antitheft device which will permit an automobile to be driven away but which will interfere with the proper operation of the automobile a predetermined variable time after its theft.

It is an important feature of the invention that the protection device is self-resetting and will result in stalling of the automobile unless, in each instance, promptly after the ignition is turned on, the user depresses or operates the reset switch 37.

Optionally, means are provided for maintaining a current flow through the latching coil for a selected short period of time after the ignition has been shut off, thus to enable the car to be restarted after it has been shut off for a short time, such as would be the case where the motor stalled.

It will be appreciated from the circuit description above that the protection device is comprised of simple and readily available parts and, thus, the use of the device will not add materially to the cost of the vehicle, either as original equipment or as a subsequently added modification.

The reset switch may be inconspicuously located at any position convenient for the driver and, hence, even an experienced car thief familiar with the principle of operation of the protection device but unfamiliar with its location in any given automobile, will be frustrated in his attempt to defeat the device.

Preferably the conductors running from the coil primary to the time delay relay and from the relay to the points are of the armored and crimped type, to frustrate tampering.

Having thus described the invention and illustrated its use, what is claimed as new and is desired to be secured by Letters Patent is:

1. An automatic resetting automobile theft prevention device comprising, in combination with an automobile having an ignition circuit including a battery and an ignition lock switch for connecting said battery to said circuit, a time delay relay including normally closed switch contacts in series connection with said ignition circuit, and a time delay, contact-opening circuit, a control relay shiftable between first and second conditions of operation and including a latching coil adapted, when energized, to maintain said control relay in said second condition, means for shifting said control relay from said second to said first condition when said coil is deenergized, first switch means in said control relay for connecting said contact-opening circuit of said delay relay to said battery responsive to activation of said ignition circuit when said control relay is in said first condition, second switch means in said control relay for energizing said latching coil when said control relay is in said second condition, and self-opening open-setting switch means for temporarily energizing said latching coil to shift said control relay to said second condition responsive to simultaneous closing of said setting switch and said lock switch, said coil being deenergized responsive to deactivation of said ignition lock switch.

2. The device of claim 1 and including a bypass switch for maintaining said latching coil in energized condition when said lock switch is in the closed position.

3. The device of claim 1 wherein said time delay relay is of the thermal type and said contact-opening circuit includes means for varying the time required to activate said opening circuit.

4. The device of claim 1 wherein said normally closed switch contacts are interposed between the primary of the ignition coil and the distributor points, whereby said ignition circuit will be opened responsive to energization of said contact-opening circuit notwithstanding the bypassing of said lock switch or the use of an auxiliary battery.

5. The device of claim 1 and including holding means for maintaining said relay in said second condition for a predetermined time following deactivation of said ignition lock.

6. An automatically resetting automobile theft prevention device comprising, in combination with an automobile having an ignition circuit including a battery and an ignition lock switch means for connecting said battery to said circuit, a thermal time delay relay means including a pair of normally closed contacts in series connection in said ignition circuit, and a normally closed heater circuit adapted to open said contacts after energization for a predetermined time, said heater circuit being energized responsive to closing of said ignition lock switch means, holding circuit means including a coil, for deactivating said heater circuit in the energized condition of said coil, and concealed switch means for activating said holding circuit means after said lock switch is in the open position, said holding circuit means being connected to said ignition circuit and being deactivated responsive to interruption of said ignition circuit.

7. A device in accordance with claim 6 and including means for preventing deactivation of said holding circuit for a selected time period after interruption of said ignition circuit.